US007192043B1

(12) United States Patent
McLuen

(10) Patent No.: US 7,192,043 B1
(45) Date of Patent: Mar. 20, 2007

(54) MULTI-TERRAIN WHEEL CHAIR

(75) Inventor: Gary R. McLuen, Alameda, CA (US)

(73) Assignee: McLuen Design, Inc., Port Townsend, WA (US)

( * ) Notice: Subject to any disclaimer, the term of this patent is extended or adjusted under 35 U.S.C. 154(b) by 9 days.

(21) Appl. No.: 10/854,615

(22) Filed: May 25, 2004

(51) Int. Cl.
*B62M 1/14* (2006.01)

(52) U.S. Cl. ...................... 280/250.1; 280/62; 280/650

(58) Field of Classification Search .................. 280/62, 280/250.1, 650, 282
See application file for complete search history.

(56) References Cited

U.S. PATENT DOCUMENTS

| | | | | |
|---|---|---|---|---|
| 2,765,860 | A | 10/1956 | Church | 180/6.4 |
| 2,895,742 | A * | 7/1959 | Johnson | 280/47.41 |
| 4,245,847 | A * | 1/1981 | Knott | 280/5.2 |
| 4,310,167 | A * | 1/1982 | McLaurin | 280/5.28 |
| 4,392,690 | A * | 7/1983 | Anderson | 301/121 |
| 4,545,593 | A | 10/1985 | Farnam | 280/242 |
| 4,892,323 | A | 1/1990 | Oxford | 280/250.1 |
| 5,149,118 | A | 9/1992 | Oxford | 280/250.1 |
| 5,176,393 | A * | 1/1993 | Robertson et al. | 280/250.1 |
| 5,364,120 | A * | 11/1994 | Shimansky | 280/650 |
| 5,427,398 | A | 6/1995 | Weybrecht | 280/304.1 |
| 5,507,513 | A | 4/1996 | Peters et al. | 280/250.1 |
| 5,605,345 | A * | 2/1997 | Erfurth et al. | 280/250.1 |
| D380,991 | S | 7/1997 | Deming | D12/131 |
| 5,704,627 | A * | 1/1998 | Davis et al. | 280/304.1 |
| D401,191 | S | 11/1998 | Gagnon | D12/131 |
| 5,964,473 | A * | 10/1999 | Degonda et al. | 280/250.1 |
| 6,073,958 | A | 6/2000 | Gagnon | 280/650 |
| 6,454,286 | B1 * | 9/2002 | Hosino | 280/250.1 |
| 2003/0168264 | A1 * | 9/2003 | Goertzen et al. | 180/65.1 |
| 2005/0168033 | A1 * | 8/2005 | Peterson | 297/337 |

OTHER PUBLICATIONS

SpinLife.Com., Landeez All-Terrain Misc Sport Chair, Oct. 27, 2003.

SpinLife.Com., Tremor Sport Wheelchair, Oct. 27, 2003.

* cited by examiner

*Primary Examiner*—Kevin Hurley
(74) *Attorney, Agent, or Firm*—Haverstock & Owens LLP

(57) ABSTRACT

A multi-terrain foldable wheelchair preferably comprises a foldable frame configured for carrying a user in a seated position. The frame further comprises a plurality of hinges configured to allow the frame to fold. Further, the multi-terrain wheelchair comprises a pair of front driving wheels that are rotatably mounted on the front portion of the foldable frame and a single rear castor wheel that is rotatably mounted on the rear portion of the foldable frame. Preferably, when the frame is folded, the driving wheels and the castor wheel are aligned in substantially the same plane. In alternative embodiments, the pair of driving wheels each comprise a driving wheel hub, a driving wheel connector, or driver wheel housings coupled to the frame and configured to allow the pair of the driver wheels to spin. Further, in alternative embodiments, the castor wheel comprises a castor wheel hub, a castor wheel connector, or a castor wheel housing coupled to the frame and configured to allow the castor wheel to spin.

41 Claims, 5 Drawing Sheets

MULTI-TERRAIN WHEEL CHAIR

FIELD OF THE INVENTION

The present invention relates to the field of wheelchairs. More particularly, the present invention relates to wheelchairs capable of being utilized in multi-terrains outdoors and indoors.

BACKGROUND OF THE INVENTION

Typical wheelchairs have two large diameter rear driving wheels positioned beneath the seat portion of the chair and smaller diameter pivoting castor wheels (four to eight inches in size) positioned in front of the rear wheels. However, the problem with these current wheelchairs is that the smaller castors provide reduced stability and are not usable off-road. Problems encountered by a user attempting to utilize a typical wheelchair off-road include: instability caused by a high center of gravity, causing the wheelchair to topple backwards or sideways when negotiating steep grades; the wheels becoming stuck while traversing uneven surfaces; and/or the wheelchair is unable to traverse over objects in its path due to instability or inadequate clearance. Further, if the wheelchair is configured to have more clearance, a user's legs will not fit under tables.

To address the uphill stability/tipping concerns, some wheelchairs are equipped with anti-tippers. Anti-tippers are additional little wheels designed to prevent a wheelchair from tipping over backward. But anti-tippers restrict a wheelchair's ability to go over obstacles because they can get caught on the obstacle. In addition, adjusting, engaging, or disengaging the anti-tippers is extremely difficult for a seated wheelchair user because the anti-tippers can not be reached easily by the user.

Even when utilizing sport model wheelchair types (i.e., where the chair is configured such that the user's knees are bent upward and the feet rest nearly in the same plane as the buttocks), a wheelchair user is faced with similar problems when attempting to traverse off-road and in a steep incline situation.

SUMMARY OF THE INVENTION

A multi-terrain wheelchair is disclosed. This multi-terrain wheelchair is a lightweight, manually powered wheelchair that allows a user to easily traverse dirt roads, ruts, trails, rough ground, and similar hindrances, and still be usable indoors. The preferred embodiment of the present invention is configured with two driving wheels in the front where the user has more power, and a single large diameter castor wheel in the back. The single, large diameter castor wheel in the back provides for stability when the multi-terrain wheelchair is used up an incline (e.g., uphill). The two front driving wheels are configured to allow enough room for a user's feet, yet still permit the multi-terrain wheelchair to traverse obstacles. In addition, the large front driving wheels are configured such that they do not dig into gravel and soft dirt in order to allow for easier travel over gravel and soft dirt.

The preferred embodiment of the current invention folds into a compact package for stowing and enables all wheels to stay on the ground when riding or while on uneven surfaces. Further, preferably the multi-terrain wheelchair is configured such that it can be folded and stowed with no need to remove parts.

Specifically, the multi-terrain wheelchair preferably comprises a foldable frame configured for carrying a user in a seated position. In the preferred embodiment, the frame further comprises a plurality of hinges configured to allow the frame to fold. In alternative embodiments, the frame is not foldable. Further, the multi-terrain wheelchair comprises a pair of front driving wheels that are rotatably mounted on the front portion of the foldable frame and a single rear castor wheel that is rotatably mounted on the rear portion of the foldable frame. Preferably, when the frame is folded, the driving wheels and the castor wheel are aligned in substantially the same plane. The frame preferably comprises a lightweight metal. For example, in one embodiment, the frame comprises a lightweight polymer.

The diameter of the single rear castor has a much larger diameter than castor wheels in existing wheelchairs. The castor wheel disclosed is positioned on the rear portion of the rear foldable frame and in between the two driving wheels. In one embodiment of the current invention, the castor wheel is approximately ¼ less than the diameter of the pair of front driving wheels. It should be understood that the diameters of the pair of front driving wheels are equal.

Preferably, the pair of front driving wheels and the single rear castor wheel are aligned in substantially the same plane once the foldable frame is folded. In other embodiments, the pair of front driving wheels and the single rear castor wheel are not aligned in substantially the same plane once the foldable frame is folded, but are slightly offset. In yet other embodiments, the pair of front driving wheels fold upward and the single rear castor wheel folds downward such that the wheels are aligned in substantially stacked configuration once the foldable frame is folded. In alternative embodiments, the multi-terrain wheelchair further comprises a plurality of shock-absorbers configured to couple with the frame, the driving wheels, and the castor wheel.

The driving wheels are preferably in a rotatably mounted configuration and are configured to engage multi-terrain types. The driving wheels are coupled to the frame and are positioned on the frontward portion of the frame. Further, the castor wheel is preferably configured to also engage multi-terrain types and is coupled to the frame and positioned on the rearward portion of the frame. As state above, the preferred castor wheel is parallel to and positioned rearwardly to and between the driving wheels.

In alternative embodiments, the multi-terrain wheelchair comprises a foldable frame comprising at least one driving wheel connector. The driving wheel connector is positioned on the frontward portion of the frame. Further, the foldable frame comprises at least one castor connector that is positioned on the rearward portion of the frame. In addition, this alternative embodiment comprises two driving wheels each separately coupled to the driving wheel connector. Also, the multi-terrain wheelchair comprises one rotatably mounted castor coupled to the castor connector.

In another embodiment, a tri-wheeled multi-terrain wheelchair is disclosed. The wheelchair comprises a foldable frame. The foldable frame comprises a front portion, a rear portion, a top portion, a bottom portion, a first side, and a second side. The tri-wheeled wheelchair further comprises a first driving wheel coupled to the first side of the foldable frame. The first driving wheel is positioned on the front portion of the foldable frame. Also, the tri-wheeled wheelchair comprises a second driving wheel coupled to the second side of the foldable frame. This second driving wheel is positioned directly across from the first driving wheel and on the front portion of the foldable frame. Further, a castor wheel is coupled to the rear portion of the foldable frame.

This castor wheel is positioned between the first and the second driving wheel. Finally, a seat is coupled to the top portion of the foldable frame and positioned between the first and second driving wheel and approximately on the front portion of the foldable frame.

Another embodiment of the multi-terrain foldable wheelchair comprises a foldable frame. This foldable frame comprises a backrest and a seat. The foldable frame is in a tubular configuration in one embodiment. In alternative embodiments, the foldable frame further comprises an axle. The axle comprises a quick release connection configured to allow the driving wheels and the castor wheel to detachably couple with the frame.

This alternative embodiment further comprises a pair of driving wheels coupled to the frame and positioned on the frontward portion of the frame. The driving wheels each comprise a hub. In alternative embodiments, the driving wheels each comprise a hand rim and a plurality of spokes.

A castor wheel comprising a hub is coupled to the frame and is positioned between the pair of driving wheels on the rearward portion of the frame. In alternative embodiments, the castor wheel further comprises a hand rim and a plurality of spokes.

Further, this embodiment of the wheelchair comprises a brake coupled to the frame. The brake is configured to stop movement of the driving wheels and the castor wheel. The brake comprises a mechanical lever system in an embodiment.

In this embodiment, a castor housing is also present. The castor housing is coupled to the frame and the castor wheel. The castor housing is configured to allow the castor wheel to spin (e.g., rotate 360 degrees).

This wheelchair further comprises a pair of swing away foot rests configured to serve as a platform on which a user's feet may be supported. The pair of swing away foot rests are coupled to the frame and are configured to rotate outwardly. Finally, in alternative embodiments, the multi-terrain foldable wheelchair further comprises a plurality of shock-absorbers configured to couple with the frame, the driving wheels, and the castor wheel.

In addition to the wheelchair embodiments disclosed above, a method of fabricating a multi-terrain wheelchair is disclosed. Specifically, the method of fabricating comprises first fabricating a frame configured to fold. Next, a first driving wheel with a first diameter is fabricated. Then, a second driving wheel with a diameter equal to the first diameter is fabricated. A castor wheel with a second diameter is next fabricated. The first driving wheel is positioned approximately on the front of the frame and coupled to the frame. Next, the second driving wheel is positioned directly across from the first driving wheel and approximately on the front of the frame and is coupled to the frame. Finally, the castor wheel is positioned between the first and the second driving wheels and coupled to the rear of the foldable frame.

DETAILED DESCRIPTION OF THE INVENTION

A multi-terrain wheelchair 100 is disclosed. The multi-terrain wheelchair 100 is a lightweight, manually powered wheelchair that allows a user to easily traverse dirt roads, ruts, trails, rough ground, and similar hindrances, and still be usable indoors. The preferred embodiment of the present invention is configured with two driving wheels in the front where the user has more power, and a single large diameter wheel castor in the rear.

Figure 1A:
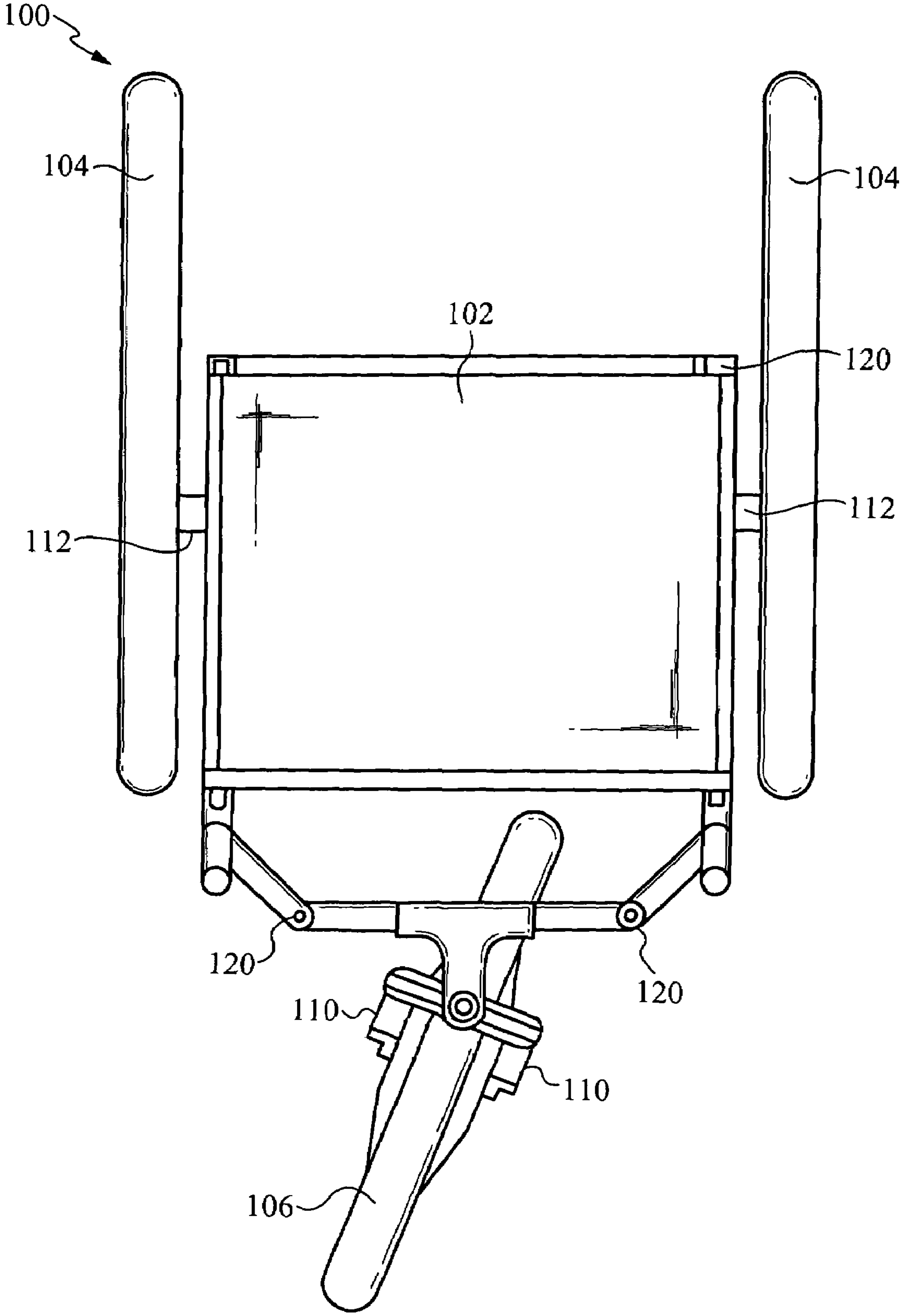
FIG. 1A illustrates a top view of the foldable multi-terrain wheelchair, in accordance with the instant invention.
Figure 1B:
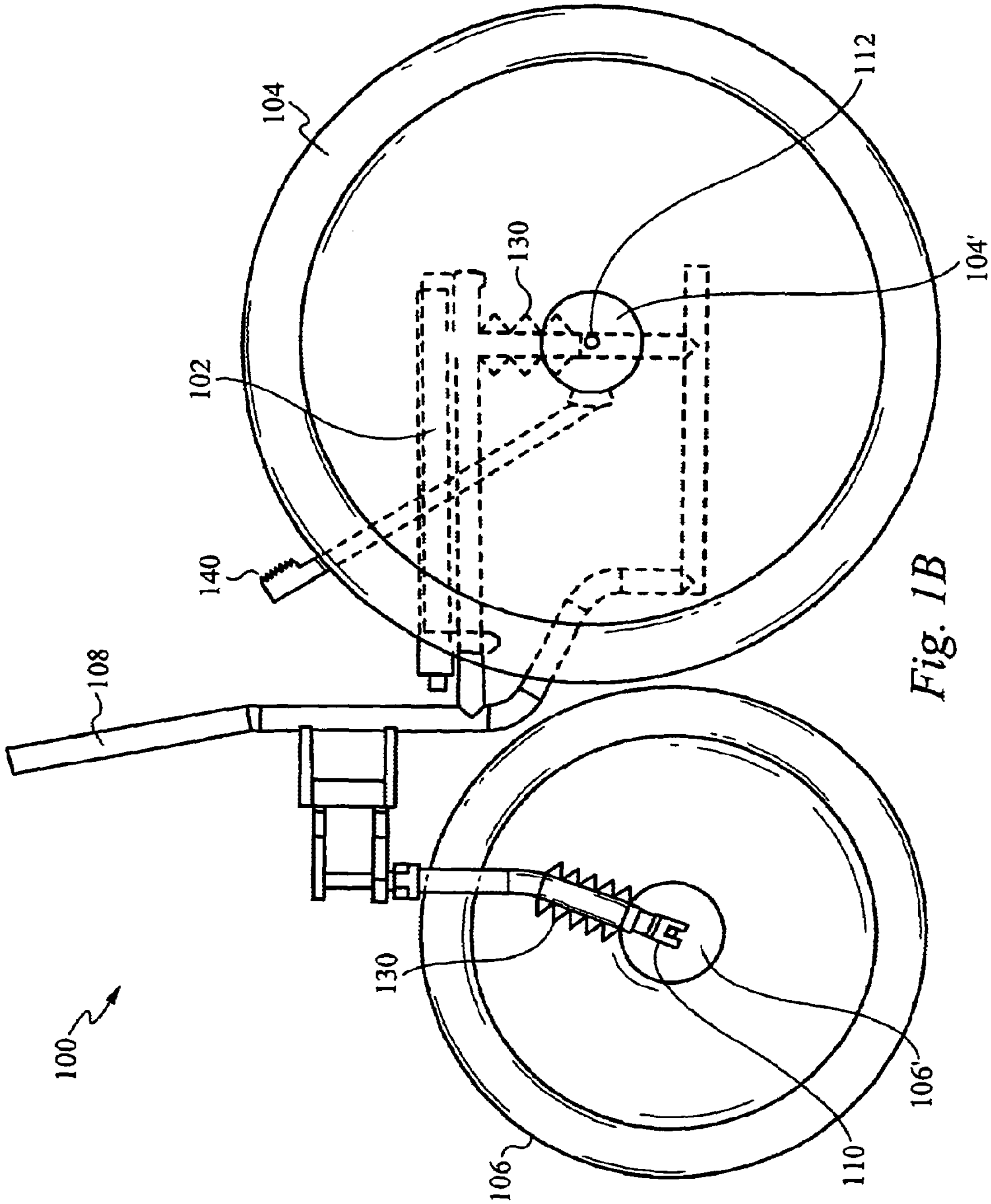
FIG. 1B illustrates a side view of the foldable multi-terrain wheelchair, in accordance with the instant invention.
Figure 1C:
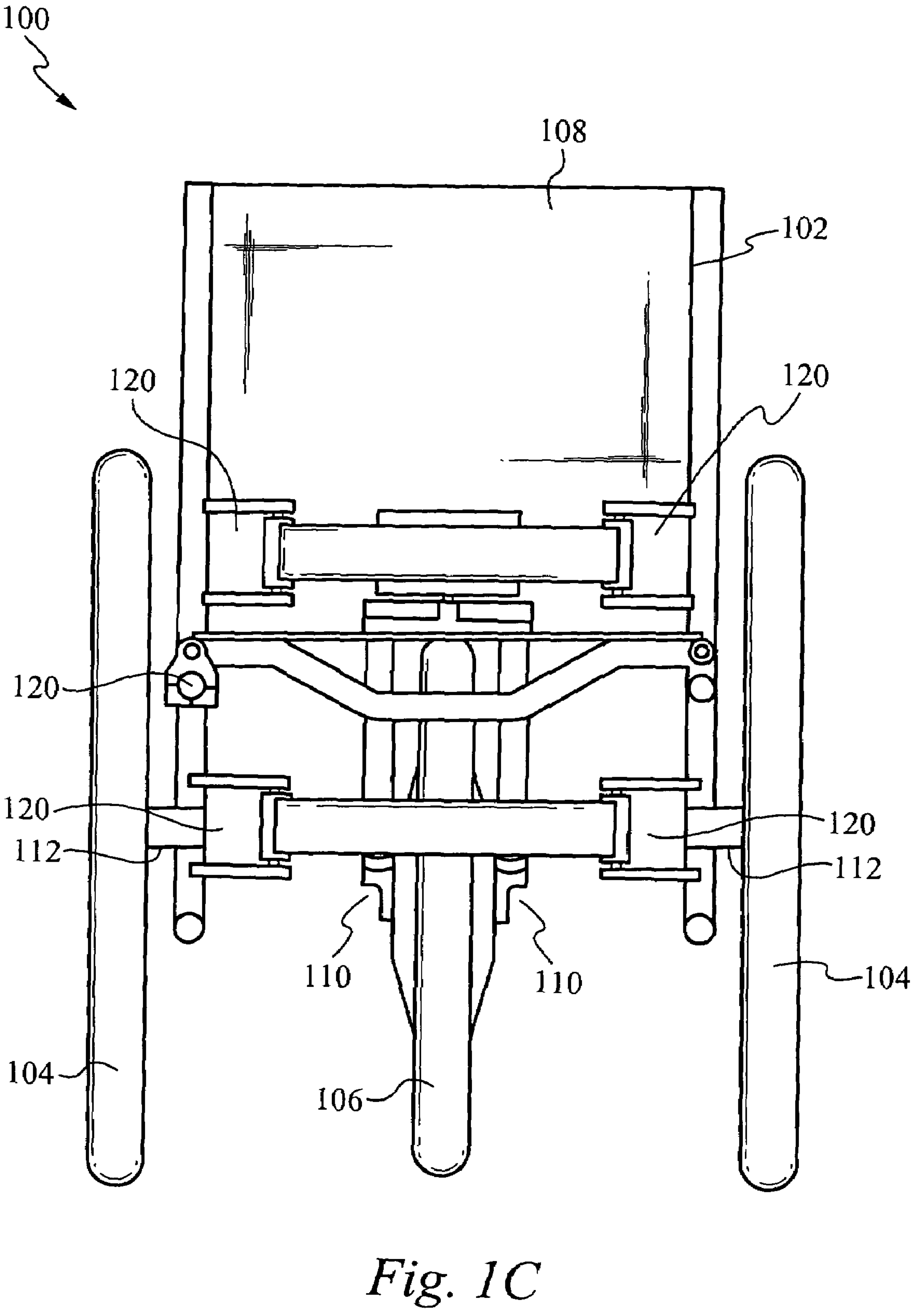
FIG. 1C illustrates a front view of the foldable multi-terrain wheelchair, in accordance with the instant invention.
Figure 2:
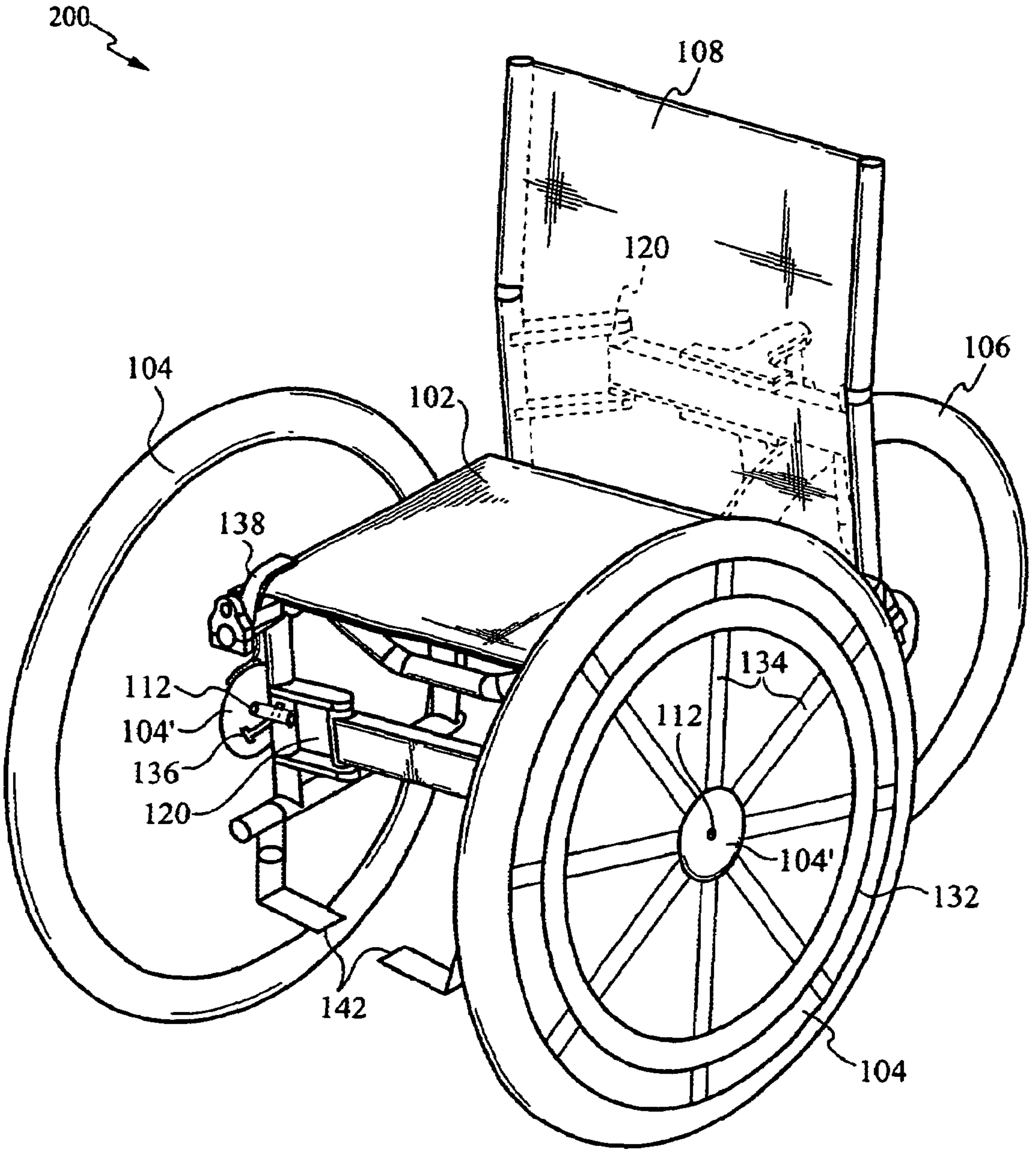
FIG. 2 illustrates an isometric view of the foldable multi-terrain wheelchair, in accordance with the instant invention.

FIG. 1A illustrates a top view, FIG. 1B illustrates a side view, FIG. 1C illustrates a front view, and FIG. 2 illustrates an isometric view of the foldable multi-terrain wheelchair 100, in accordance with the instant invention. Specifically, FIGS. 1A–C illustrate a foldable multi-terrain wheelchair 100. The foldable multi-terrain wheelchair 100 comprises a frame 102 configured for carrying a user (not shown). The frame 102 is preferably foldable and further comprises a plurality of hinges 120 configured to allow the frame 102 to fold. The wheelchair 100 further comprises a pair of front driving wheels 104. The pair of front driving wheels 104 are rotatably mounted on the front portion of the frame 102. The wheelchair 100 further comprises a single rear castor wheel 106. The single rear castor wheel 106 is rotatably mounted on the rear portion of the frame 102.

In the preferred embodiment, the first and the second driving wheels 104 and the castor wheel 106 of the multi-terrain wheelchair 100 are aligned in substantially the same plane once the frame 102 is folded. In another embodiment (not shown), the first and the second driving wheels 104 and the castor wheel 106 are not aligned in substantially the same plane once the frame 102 is folded. In yet other embodiments (not shown), the first and the second driving wheels 104 fold upward and the castor wheel 106 folds downward such that the first and the second driving wheels 104 and the castor wheel 106 are aligned in substantially stacked configuration once the foldable frame is folded.

The two front driving wheels 104 each have a first diameter, and the one rear castor wheel 106 has a second diameter, wherein the second diameter is smaller than the first diameter. Preferably, the second diameter of the single rear castor wheel 106 is approximately ¼ less than the first diameter of the pair of front driving wheels 104.

In alternative embodiments, the multi-terrain wheelchair 100 further comprises a plurality of shock-absorbers 130 configured to couple with the frame 102, the driving wheels 104, and castor wheel 106.

In yet another embodiment, the multi-terrain wheelchair 100 comprises a plurality of rotatably mounted driving wheels (not shown) similar to the driving wheels 104, that are configured to engage multi-terrains and coupled to and positioned on the frontward portion of the frame 102. In this alternative embodiment (not shown), the wheelchair 100 further comprises at least one rotatably mounted castor wheel, similar to the castor wheel 106, that is configured to engage multi-terrains and is coupled to and positioned on the rearward portion of the frame 102. This at least one rotatably mounted castor wheel is parallel to and positioned rearwardly to and between the plurality of driving wheels 104.

Although the preferred multi-terrain wheelchair 100 of the present invention comprises one castor wheel connector otherwise referred to as a castor wheel coupler, on the rearward portion of the frame 102 and a pair of driving wheels 104 on the frontward portion of the frame 102, it should be understood that in alternative embodiments, the multi-terrain wheelchair 100 includes at least one driving wheel connector or driver wheel coupler 112 positioned on the frontward portion of the frame 102 and at least one castor connector or castor wheel coupler 110 positioned on the rearward portion of the frame 102. In this alternative embodiment, the wheelchair 100 comprises two driving wheels 104 each separately coupled to the at least one driving wheel connector or driver wheel coupler 112 and one rotatably mounted castor wheel 106 coupled to the at least one castor connector or castor wheel coupler 110.

In yet another embodiment, the multi-terrain wheelchair 100 is in a tri-wheeled configuration and comprises a foldable frame 102 comprising a front portion, a rear portion, a top portion, a bottom portion, a first side, and a second side. A first driving wheel is coupled to the first side of the foldable frame 102. This first driving wheel is positioned on the front portion of the foldable frame 102. A second driving wheel is coupled to the second side of the foldable frame 102 and is positioned directly across from the first driving wheel and on the front portion of the foldable frame 102. The tri-wheeled wheelchair 100 further comprises a castor wheel 106 coupled to the rear portion of the foldable frame 102. The castor wheel 106 is positioned between the first and the second driving wheel. Finally, the tri-wheeled wheelchair 100 comprises a seat and a backrest 108 coupled to the top portion of the foldable frame 102 and positioned between the first and second driving wheel and approximately on the front portion of the foldable frame 102. Further, as with the other embodiments, the first and the second driving wheels 104 each have a first diameter, and the castor wheel 106 has a second diameter, wherein the second diameter is smaller than the first diameter, and is preferably approximately ¼ less than the first diameter.

In other embodiments of the multi-terrain foldable wheelchair 100, a pair of driving wheels 104 each comprising a driving wheel hub 104' (FIG. 1B) are coupled to the driving wheel connectors 112. The driving wheel connectors 112 are coupled to the frame 102 and are positioned on the frontward portion of the frame 102. Also, a castor wheel 106 comprising a castor wheel hub 106' (FIG. 1B) is coupled to the rotatably mounted castor wheel 106. The castor wheel hub 106' is coupled to the frame 102 and is positioned between the pair of driving wheels 104 on the rearward portion of the frame 102. This alternative embodiment further comprises a brake 138 that is coupled to the frame 102 and is configured to stop movement of the driving wheels 104 and the castor wheel 106. The brake preferably comprises a mechanical lever system 140. In another embodiment, the brake 138 is in a hand-brake configuration (e.g., is activated manually by hand).

In alternative embodiments, a pair of driver wheel housings (not shown) configured to allow the pair of the driver wheels to spin (e.g., rotate 360 degrees) are coupled to the frame 102 and separately coupled to each of the pair of driver wheels. Similarly, a castor wheel housing (not shown) configured to allow the castor wheel 106 to spin (e.g., rotate 360 degrees) is coupled to the frame 102 and the castor wheel 106. Finally, a pair of swing away foot rests 142 configured to serve as a platform on which feet may be supported are coupled to the frame 102 and are configured to rotated outwardly.

The frame 102 is preferably foldable and in a tubular configuration. In alternative embodiments, the frame 102 further comprises an axle (not shown) configured to couple to the driving wheels 104 and/or the castor wheel 106. The axle (not shown) alternatively comprises a quick release connection 136 configured to allow the driving wheels 104 and the castor wheel 106 to detachably couple with the frame 102.

The pair of driving wheels 104 and the castor wheel 106, in alternative embodiments, further each comprise a hand rim 132 and a plurality of spokes 134.

FIG. 2 illustrates an isometric view of the foldable multi-terrain wheelchair 200, in accordance with the instant invention, and as discussed in detail in the description of FIGS. 1A–C, above.

Figure 3:
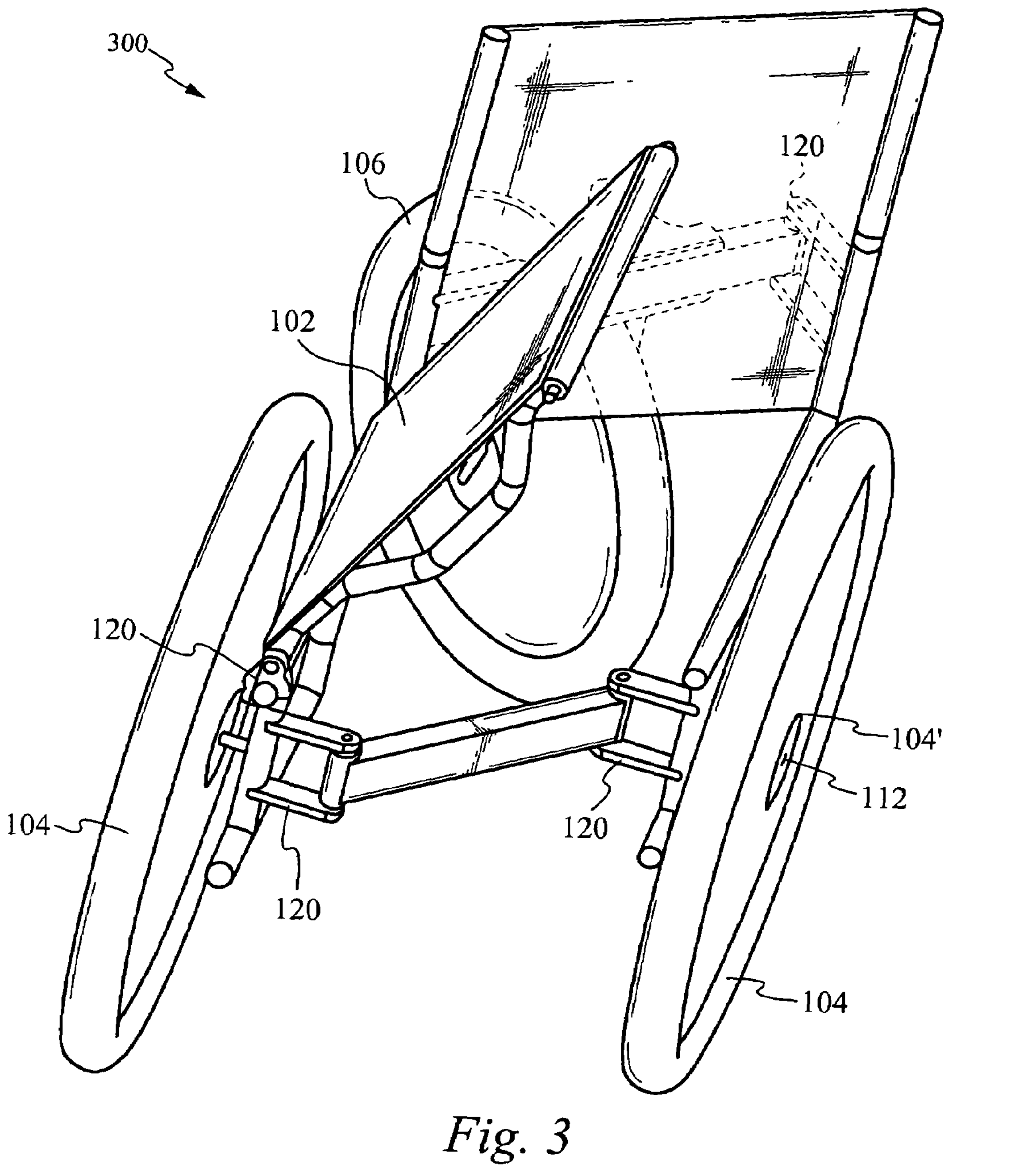
FIG. 3 illustrates an isometric view of the foldable multi-terrain wheelchair in a semi-folded state, in accordance with the instant invention.

FIG. 3 illustrates an isometric view of the foldable multi-terrain wheelchair 300 in a semi-folded state, in accordance with the instant invention, and as discussed in detail in the description of FIGS. 1A–C, above. Specifically, the multi-terrain wheelchair 300 shown in FIG. 3 is the same as that described in the discussion of FIGS. 1 and 2. As seen in FIG. 3, the pair of front driving wheels 104 and the single rear castor wheel 106 of the multi-terrain wheelchair 300 are aligned in substantially the same plane once the foldable frame is folded. Similarly, in alternative embodiments, a plurality of parallel driving wheels and at least one rotatably mounted castor wheel are aligned in substantially the same plane once the frame is folded. In other embodiments (not shown), the pair of front driving wheels 104 and the single rear castor wheel 106 are not aligned in substantially the same plane once the foldable frame is folded. In yet other embodiments (not shown), the pair of front driving wheels 104 fold upward and the single rear castor wheel 106 folds downward such that the wheels are aligned in substantially stacked configuration once the foldable frame is folded.

In addition to the multi-terrain wheelchair itself, a method of fabricating a multi-terrain wheelchair is also disclosed. The method first comprises fabricating a frame configured to fold. The method next comprises fabricating a first driving wheel with a first diameter and then fabricating a second driving wheel with the first diameter. Next, a castor wheel with a second diameter is fabricated. The first driving wheel is next positioned approximately on the front of the frame and coupled to the frame. Next, the second driving wheel is positioned directly across from the first driving wheel and approximately on the front of the frame and coupled to the frame. Finally, the castor wheel is positioned between the first and the second driving wheels and coupled to the rear of the foldable frame. Preferably, the first diameter is approximately ¼ larger than the second diameter. In an alternative embodiments of this method the frame comprises a lightweight metal, a lightweight polymer, or combination.

The multi-terrain wheelchair currently disclosed provides an improved multi-terrain wheelchair that may be utilized on a wide range of terrains. Further, the current invention provides for increased stability and mobility at a reduced cost and without cumbersome, heavy, or unaesthetic parts. In short, the current multi-terrain wheelchair provides an economically, aesthetically, and socially improved wheelchair allowing users to do and see things that were previously unavailable due to limitations in existing wheelchairs which hinder multi-terrain mobility.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to one of ordinary skill in the art that the device of the present invention could be implemented in several different ways and the embodiments disclosed above are only exemplary of the preferred embodiment and the alternative embodiments of the invention and is in no way a limitation. It will be apparent to those skilled in the art that modifications may be made in the embodiment chosen for illustration without departing from the spirit and scope of the invention.

What is claimed is:

1. A multi-terrain wheelchair comprising:

a. a foldable frame configured for carrying a user, the foldable frame including a front portion and a rear portion;

b. two front multi-terrain driving wheels, wherein the front driving wheels are rotatably mounted on the front portion of the foldable frame; and c. a rear multi-terrain castor wheel, wherein the rear castor wheel is rotatably mounted on the rear portion of the foldable frame between the two front multi-terrain driving wheels.

2. The multi-terrain wheelchair of claim 1, wherein the front driving wheels and the rear castor wheel are aligned substantially parallel once the foldable frame is folded.

3. The multi-terrain wheelchair of claim 1, wherein the front driving wheels and the rear castor wheel are not aligned in substantially the same plane once the foldable frame is folded.

4. The multi-terrain wheelchair of claim 1, wherein the front driving wheels fold and the rear castor wheel folds such that the front driving wheels and the rear castor wheel are aligned in substantially stacked configuration once the foldable frame is folded.

5. The multi-terrain wheelchair of claim 1, wherein each of the front driving wheels have a first diameter and the rear castor wheel has a second diameter, wherein the second diameter is smaller than the first diameter.

6. The multi-terrain wheelchair of claim 5, wherein the second diameter is approximately ¼ less than the first diameter.

7. The multi-terrain wheelchair of claim 1, further comprising a plurality of shock-absorbers configured to couple with the frame, the front driving wheels, and the rear castor wheel.

8. The multi-terrain wheelchair of claim 1, wherein the foldable frame further comprises a plurality of hinges configured to allow the frame to fold.

9. A multi-terrain wheelchair comprising:

a. a frame including a frontward portion and a rearward portion;

b. a plurality of rotatably mounted driving wheels coupled to and positioned on the frontward portion of the frame and configured to engage multi-terrains; and c. at least one rotatably mounted castor wheel configured to engage multi-terrains coupled to and positioned on the rearward portion of the frame, wherein the at least one rotatably mounted castor wheel is parallel to and positioned rearwardly to and between the plurality of driving wheels.

10. The multi-terrain wheelchair of claim 9, wherein the frame is foldable.

11. The multi-terrain wheelchair of claim 10, wherein the plurality of rotatably mounted driving wheels and the at least one rotatably mounted castor wheel are aligned substantially parallel once the frame is folded.

12. The multi-terrain wheelchair of claim 10, wherein the plurality of rotatably mounted driving wheels and the at least one rotatably mounted castor wheel are not aligned in substantially the same plane once the frame is folded.

13. The multi-terrain wheelchair of claim 10, wherein the plurality of rotatably mounted driving wheels fold and the at least one rotatably mounted castor wheel folds such that the plurality of rotatably mounted driving wheels and the at least one castor wheel are aligned in substantially stacked configuration once the frame is folded.

14. The multi-terrain wheelchair of claim 9, wherein the frame is configured to seat a user.

15. The multi-terrain wheelchair of claim 9, wherein a diameter of the at least one rotatably mounted castor wheel is approximately ¼ less than a diameter of the plurality of rotatably mounted driving wheels.

16. The multi-terrain wheelchair of claim 9, further comprising a plurality of shock-absorbers configured to couple with the frame, the driving wheels, and the castor wheel.

17. A multi-terrain wheelchair comprising:

a. a foldable frame including a frontward portion and a rearward portion, wherein the foldable frame further comprises a plurality of driving wheel connectors positioned on the frontward portion of the frame and at least one castor connector positioned on the rearward portion of the frame;

b. two multi-terrain driving wheels each separately coupled to one of the at least one driving wheel connectors; and c. a rotatably mounted multi-terrain castor wheel coupled to the at least one castor connector, wherein the multi-terrain castor wheel is positioned rearwardly to and between the two multi-terrain driving wheels.

18. The multi-terrain wheelchair of claim 17, wherein the two driving wheels and the rotatably mounted castor wheel are aligned substantially parallel once the frame is folded.

19. The multi-terrain wheelchair of claim 17, wherein the two driving wheels and the rotatably mounted castor wheel are not aligned in substantially the same plane once the frame is folded.

20. The multi-terrain wheelchair of claim 17, wherein the two driving wheels fold and the rotatably mounted castor wheel folds such that the two driving wheels and the castor wheel are aligned in substantially stacked configuration once the frame is folded.

21. The multi-terrain wheelchair of claim 17, wherein the foldable frame is configured to seat a user.

22. The multi-terrain wheelchair of claim 17, wherein the two driving wheels each have a first diameter, and the rotatably mounted castor wheel has a second diameter.

23. The multi-terrain wheelchair of claim 22, wherein the second diameter is approximately ¼ less than the first diameter.

24. The multi-terrain wheelchair of claim 17, further comprising a plurality of shock-absorbers configured to couple with the frame, the two driving wheels, and the rotatably mounted castor wheel.

25. A tri-wheeled multi-terrain wheelchair comprising:

a. a foldable frame comprising a front portion, a rear portion, a top portion, a bottom portion, a first side, and a second side, wherein the foldable frame is foldable about a vertical axis;

b. a first driving wheel coupled to the first side of the foldable frame, wherein the first driving wheel is positioned on the front portion of the foldable frame;

c. a second driving wheel coupled to the second side of the foldable frame, wherein the second driving wheel is positioned across from the first driving wheel and on the front portion of the foldable frame;

d. a castor wheel coupled to the rear portion of the foldable frame, wherein the castor wheel is positioned between the first and the second driving wheels; and e. a seat and backrest coupled to the top portion of the foldable frame and positioned between the first and second driving wheels.

26. The tri-wheeled multi-terrain wheelchair of claim 25, wherein the first and the second driving wheels and the castor wheel are aligned substantially parallel once the frame is folded.

27. The tri-wheeled multi-terrain wheelchair of claim 25, wherein the first and the second driving wheels and the castor wheel are not aligned in substantially the same plane once the frame is folded.

28. The tri-wheeled multi-terrain wheelchair of claim 25, wherein the first and the second driving wheels fold and the castor wheel folds such that the first and the second driving wheels and the castor wheel are aligned in substantially stacked configuration once the frame is folded.

29. The tri-wheeled multi-terrain wheelchair of claim 25, wherein the foldable frame is configured to carry a user.

30. The tri-wheeled multi-terrain wheelchair of claim 25, wherein the first and the second driving wheels each have a first diameter, and the castor wheel has a second diameter.

31. The tri-wheeled multi-terrain wheelchair of claim 30, wherein the second diameter is approximately ¼ less than the first diameter.

32. The tri-wheeled multi-terrain wheelchair of claim 25, further comprising a plurality of shock-absorbers configured to couple with the foldable frame, the first and second driving wheels, and the castor wheel.

33. A multi-terrain foldable wheelchair comprising:

a. a frame comprising a backrest and a seat, the frame including a frontward portion and a rearward portion;

b. a pair of driving wheels each comprising a driving wheel hub, wherein the pair of driving wheels are coupled to the frame and are positioned on the frontward portion of the frame;

c. a castor wheel comprising a castor wheel hub, wherein the castor wheel is coupled to the frame and is positioned between the pair of driving wheels on the rearward portion of the frame;

d. a brake configured to stop movement of the driving wheels and the castor wheel, wherein the brake is coupled to the frame;

e. a pair of driver wheel couplers configured to allow the pair of the driver wheels to spin, wherein each of the pair of driver wheel couplers is coupled to the frame and separately coupled to each of the pair of driver wheels; and f. a castor wheel coupler configured to allow the castor wheel to spin, wherein the castor coupler is coupled to the frame and the castor wheel.

34. The multi-terrain foldable wheelchair of claim 33, wherein the frame is foldable.

35. The multi-terrain foldable wheelchair of claim 34, wherein the frame is in a tubular configuration.

36. The multi-terrain foldable wheelchair of claim 33, wherein the pair of driving wheels further each comprise a hand rim and a plurality of spokes.

37. The multi-terrain foldable wheelchair of claim 33, wherein the castor wheel further comprises a hand rim and a plurality of spokes.

38. The multi-terrain foldable wheelchair of claim 33, wherein the brake comprises a mechanical lever system.

39. The multi-terrain foldable wheelchair of claim 33, wherein the brake is in a hand-brake configuration.

40. The multi-terrain foldable wheelchair of claim 33, further comprising a plurality of shock-absorbers configured to couple with the frame, the driving wheels, and the castor wheel.

41. The multi-terrain foldable wheelchair of claim 33, further comprising a pair of swing away foot rests configured to serve as a platform on which a user's feet may be supported, wherein the pair of swing away foot rests are coupled to the frame and are configured to rotate outwardly.

* * * * *